United States Patent Office 3,134,662
Patented May 26, 1964

3,134,662
HERBICIDAL METHODS EMPLOYING BICYCLIC THIOXOPHOSPHATE NEUTRAL ESTERS
Marcel A. Gradsten, Demarest, N.J., assignor to Heyden Newport Chemical Corporation, New York, N.Y., a corporation of Delaware
No Drawing. Filed Apr. 18, 1961, Ser. No. 103,706
6 Claims. (Cl. 71—2.3)

This invention relates to novel herbicidal compositions and to methods of inhibitng plant growth. It further relates to new chemical compounds which exhibit herbicidal activity against a variety of monocotyledonous and dicotyledonous plants.

It has been discovered that trimethylolalkane thiophosphates have unusual and valuable activity as selective herbicides. These compounds have the structure

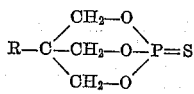

wherein R represents an alkyl group. The preferred compounds are those in which R represents a methyl, ethyl, or propyl group. Of particular value as a herbicide is the compound in which R represents an ethyl group.

The novel compounds of the present invention may be prepared by any convenient procedure. One method that has proven satisfactory involves the reaction of a trimethylolalkane with thiophosphoryl chloride. This reaction is preferably carried out in the presence of a solvent, such as benzene, toluene, or xylene, in which the chloride and the product are soluble and at the reflux temperature of the reaction mixture. If desired higher or lower reaction temperatures may be employed. Ordinarily approximately equimolar amounts of the trimethylolalkane and thiophosphoryl chloride are used, but a small excess of either of the reactants may be used if desired. The product that is recovered from the reaction mixture may be purified by known techniques, such as recrystallization, or it may be used without purification in herbicidal compositions.

The trimethylolalkane thiophosphates may be applied to a wide variety of plants to control or inhibit their growth. They may be applied to an area containing a crop, for example, a cotton crop, to inhibit the growth of weeds therein, or they may be used to keep an area free from all plant growth.

While the herbicidal compounds may be applied to the plants or to the soil as such, they are preferably used in combination with an inert carrier. The products may be mixed with or deposited upon an inert finely-divided solid and employed as dusts. Such mixtures may also be dispersed in water with or without the aid of a wetting agent and the resulting aqueous suspensions employed as sprays. Alternatively, these products may be used as the active herbicidal constituents in ketone, ether, alcohol, or hydrocarbon solutions, in oil-in-water emulsions, or in aqueous dispersions. The concentration of the trimethylolalkane thiophosphate in the herbicidal composition may vary within wide limits and depends upon a number of factors, the most important of which are the amount of the composition to be applied per unit of area and the type or types of plants being treated. Mixtures of two or more of the novel thiophosphates may be used. If desired other herbicidal compounds may also be present in the herbicidal compositions.

A method for the preparation of trimethylolpropane thiophosphate is described in Example 1. The other trimethylolalkane thiophosphates of this invention, for example, trimethylolbutane thiophosphate, may be prepared by the same procedure by using an equivalent amount of the appropriate trimethylolalkane in place of the trimethylolpropane.

EXAMPLE 1

To a solution of 85 grams (0.5 mole) of thiophosphoryl chloride in 400 ml. of benzene was added over a period of 50 minutes 67 grams (0.5 mole) of trimethylol propane. During the addition the temperature of the reaction mixture was gradually raised from 25° C. to its reflux temperature (78° C.). The reaction mixture was heated at its reflux temperature for 27 hours. At the end of this period it was filtered and then concentrated to one-third of its original volume. The resulting solution was cooled to room temperature and filtered. The crystalline product obtained was washed with 10 ml. of benzene and with two 20 ml. portions of diethyl ether and was then dried. There was obtained 28 grams of trimethylolpropane thiophosphate, a pink crystalline product that melted at 178°–181° C.

Further concentration of the reaction liquor followed by precipitation with diethyl ether yielded an additional 10 grams of the product.

EXAMPLE 2

Groups of greenhouse flats containing soil were planted with bean, cotton, corn, wheat, mustard, and pigweed seeds, respectively. In the pre-emergence tests the soil in the flats was treated with a 0.3% aqueous suspension of trimethylolpropane thiophosphate immediately after planting. In the post-emergence tests eight days after planting the plants were sprayed with a 0.3% aqueous suspension of trimethylol propane thiophosphate. The amount of the suspension used in each case was such as to apply the herbicidal compound at a rate equivalent to 4 pounds per acre. In each case the results were observed seven days after the application of the herbicidal composition.

In the table that follows, the effectiveness of the herbicidal compound, as determined by comparison with untreated plantings, is indicated by the numbers "0" through "10" in increasing order of effectiveness. Thus "0" indicates no herbicidal activity; "1–3," slight injury; "4–6," moderate injury; "7–9," severe injury; and "10" destruction of all plants.

*Effectiveness of Trimethylolpropane Thiophosphate as a Herbicide*

| | Plant species | | | | | |
|---|---|---|---|---|---|---|
| | Bean | Cotton | Corn | Wheat | Mustard | Pigweed |
| Pre-emergence test | 0 | 0 | 0 | 4 | 5 | 6 |
| Post-emergence test | 7 | 3 | 8 | 7 | 8 | 9 |

From the data in the foregoing table, it is clear that trimethylolpropane thiophosphate is effective as a herbicide against a variety of plant species. In both the pre-emergence tests and the post-emergence tests this compound was found to have greater phytotoxic effect on the weed species tested (mustard and pigweed) than on the crop species.

Similar results may be obtained in the pre-emergence test and in the post-emergence tests by using trimethylolethane thiophosphate or trimethylolbutane thiophosphate in place of trimethylolpropane thiophosphate as the active component of the herbicidal composition.

I claim:
1. A process for the control of plant growth in a medium normally supporting plant growth which com- prises applying to said medium a phytotoxic amount of a compound having the structure

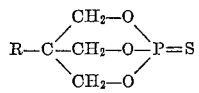

where R is lower alkyl.

2. A process for the control of plant growth which comprises applying to the plants a phytotoxic amount of a compound having the structure

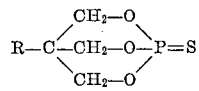

where R is lower alkyl.

3. A process for the control of plant growth in a locus comprising applying to the locus a phytotoxic amount of trimethylolethane thiophosphate having the formula:

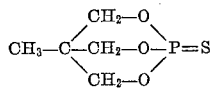

4. A process for the control of plant growth in a locus comprising applying to the locus a phytotoxic amount of trimethylolbutane thiophosphate having the formula:

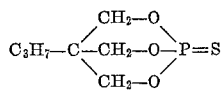

5. A process for the control of plant growth in a medium normally supporting plant growth which comprises applying to said medium a phytotoxic amount of trimethylolpropane thiophosphate, said thiophosphate having the formula

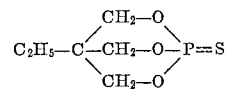

6. A process for the control of plant growth which comprises applying to the plants a phytotoxic amount of trimethylolpropane thiophosphate, said thiophosphate having the formula

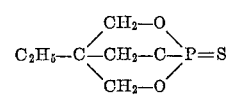

References Cited in the file of this patent
UNITED STATES PATENTS 2,643,261     Matuszak et al. _____ June 23, 1953
3,038,001     Wadsworth et al. _____ June 5, 1962

OTHER REFERENCES

Carre, Bull. Soc. Chim. 27, (3), 261–269 (1902).
Verkade et al.: "J. Org. Chem.," vol 25, pp. 663–665 (April 1960).